(12) United States Patent
Nishimura et al.

(10) Patent No.: US 8,825,104 B2
(45) Date of Patent: Sep. 2, 2014

(54) WIRELESS COMMUNICATION APPARATUS, WIRELESS COMMUNICATION SYSTEM AND TRANSMITTING POWER CONTROL METHOD

(75) Inventors: Hiroshi Nishimura, Osaka (JP); Masanori Nozaki, Osaka (JP); Yuki Kubo, Osaka (JP); Kentaro Yanagihara, Hyogo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 442 days.

(21) Appl. No.: 13/245,238

(22) Filed: Sep. 26, 2011

(65) Prior Publication Data

US 2012/0108286 A1 May 3, 2012

(30) Foreign Application Priority Data

Oct. 28, 2010 (JP) .................................. 2010-242522

(51) Int. Cl.
*H04B 7/00* (2006.01)
*H04W 52/24* (2009.01)
*H04W 52/46* (2009.01)
*H04W 52/22* (2009.01)
*H04W 52/38* (2009.01)
*H04W 52/36* (2009.01)
*H04W 52/28* (2009.01)

(52) U.S. Cl.
CPC ............ *H04W 52/46* (2013.01); *H04W 52/246* (2013.01); *H04W 52/242* (2013.01); *H04W 52/367* (2013.01); *H04W 52/287* (2013.01); *H04W 52/228* (2013.01); *H04W 52/383* (2013.01)

USPC ..................... 455/522; 455/127.1; 455/67.11; 370/252; 370/318

(58) Field of Classification Search
CPC .... H04B 17/005; H04W 40/12; H04W 40/08; H04W 52/46; H04W 88/04; H04L 45/00; H04L 45/123; H04L 45/124
USPC ........... 455/67.11, 63.1, 7, 522, 127.1, 127.5; 370/231–234, 252, 238, 318, 254
See application file for complete search history.

(56) References Cited

PUBLICATIONS

T. Clausen, Ed. et al. Request for Comments: 3626. Optimized Link State Routing Protocol (OLSR). The Internet Society. Oct. 2003. pp. 1-75.

*Primary Examiner* — Sujatha Sharma
(74) *Attorney, Agent, or Firm* — Rabin & Berdo, P.C.

(57) ABSTRACT

A wireless communication apparatus having a plurality of neighboring wireless communication apparatuses may includes a wireless transmitter, an information control storage member, and a transmitting power calculator. A wireless transmitter may transmit a wireless signal with a transmitting power to a destination wireless communication apparatus. An information control storage member may maintain first information of links between the wireless communication apparatus and the plurality of neighboring wireless communication apparatuses, and second information of a communication route between the wireless communication apparatus and the destination wireless communication apparatus. A transmitting power calculator may calculate the transmitting power based on the first and second information, so as to ensure reception of the wireless signal.

5 Claims, 12 Drawing Sheets

FIG. 3

| NEIGHBOR NODE | LINK CONDITION | ATTENUATION | USING IN ROUTE |
|---|---|---|---|
| N12 | SIMPLEX | D2 | ○ |
| N13 | DUPLEX | D3 | ✕ |
| N14 | DUPLEX | D4 | ○ |

FIG. 8

| NEIGHBOR NODE | LINK CONDITION | ATTENUATION | USING IN ROUTE |
|---|---|---|---|
| N22 | DUPLEX | D2 | ○ |
| N23 | DUPLEX | D3 | ○ |
| N24 | DUPLEX | D4 | ○ |

FIG. 9

| NEIGHBOR NODE | 2-HOP NEIGHBOR NODE |
|---|---|
| N22 | N21, N23 |
| N23 | N21, N22 |
| N24 | N21 |

WIRELESS COMMUNICATION APPARATUS, WIRELESS COMMUNICATION SYSTEM AND TRANSMITTING POWER CONTROL METHOD

CROSS-REFERENCE TO RELATED APPLICATION

This application claims priority under 35 U.S.C. §119 from Japanese Patent Application NO. P 2010-242522, filed on Oct. 28, 2010, the disclosure of which is incorporated herein by reference.

BACKGROUND OF THE INVENTION

1. Field of the Invention

This application relates to a wireless communication apparatus, wireless communication system and transmitting power control method. They are available, for example, to apply to an ad-hoc network performing a multi-hop communication.

2. Description of the Related Art

As described in the publication, Network Working Group Request for Comments 3626, Optimized Link State Routing Protocol by Clausen et. al. (Project Hipercom, INRIA, October 2003), a wireless communication apparatus may produce neighbor tables describing the information of a neighboring wireless communication apparatus, and a routing table describing the route to a destination wireless communication apparatus, by a routine control packet transaction among wireless communication apparatuses by applying OLSR (the Optimized Link State Routing) as a proactive-type routing protocol that makes a route before a communication request.

The source wireless communication apparatus outputs a data packet arranged with information of an arbitrary destination wireless communication apparatus by reference to the neighbor table and the routing table made as mentioned above, and the data packet is sent to the destination wireless communication apparatus through a relay node.

When a density of arranged wireless communication apparatuses is high, and there are many wireless communication apparatuses neighboring other wireless communication apparatuses, interference from a radio wave may occur. Also, collisions of packets such as, for example, a control packet with a data packet, may often occur. Routes typically become unsteady, and packets are often lost. As one method for solving these problems, at least the range of access of radio waves is decreased by reducing the transmitting power in high density areas of the wireless communication apparatuses. In this case, there is also an advantage of possibility of reducing a dissipation power of the wireless communication apparatus by reducing a transmitting power of the wireless communication apparatus.

However, if the transmitting power from each wireless communication apparatus is reduced, the range of access of radio waves is reduced and there is a possibility that a connectivity of a wireless communication is not maintained.

Therefore, a need exists for a wireless communication apparatus, a wireless communication system and a transmitting power control method that will maintain connectivity in a wireless network, and prevent interference from radio waves and collision of packets.

SUMMARY OF THE INVENTION

An object of the application is to disclose a wireless communication apparatus, a wireless communication system, and a transmitting power control method capable of maintaining connectivity in a wireless network and preventing interference of radio waves and collision of packets.

According to one aspect, a wireless communication apparatus having a plurality of neighboring wireless communication apparatuses, may includes a wireless transmitter, an information control storage member, and a transmitting power calculator. A wireless transmitter may transmit a wireless signal with a transmitting power to a destination wireless communication apparatus. An information control storage member may maintain first information of links between the wireless communication apparatus and the plurality of neighboring wireless communication apparatuses, and second information of a communication route between the wireless communication apparatus and the destination wireless communication apparatus. A transmitting power calculator may calculate the transmitting power based on the first and second information, so as to ensure reception of the wireless signal.

According to another aspect, a wireless communication system may include a plurality of wireless communication apparatuses that are decentrally arranged.

According to another aspect, a transmitting power control method is performed by a wireless communication apparatus configures a network. The method includes maintaining first information including links between the wireless communication apparatus and the plurality of neighboring wireless communication apparatuses, and second information including a communication route between the wireless communication apparatus and a destination wireless communication apparatus. The method also include calculating a transmitting power for a wireless signal based on the first and second information and controlling a wireless transmitter to transmit the signal using the calculated transmitting power.

BRIEF DESCRIPTION OF THE DRAWINGS

The wireless communication apparatus, the wireless communication system and the transmitting power control method will be more fully understood from the following detailed description with reference to the accompanying drawing, which is given by way of illustration only, and is not intended to limit the invention, wherein:

FIG. 3 illustrates the composition of a neighbor table according to the first embodiment;

FIG. 8 illustrates the composition of a neighbor table according to the second embodiment;

FIG. 9 illustrates the composition of a two-hop neighbor table according to the second embodiment;

DETAILED DESCRIPTION OF THE INVENTION

First Embodiment

A first embodiment of a wireless communication apparatus, a wireless communication system and a transmitting control method will be described with reference to FIGS. 1 to 5.

Composition of the First Embodiment

A wireless communication system 121 of a first embodiment is an ad-hoc network where wireless communication apparatuses are decentrally arranged to transmit and receive a packet directly among the wireless communication apparatuses (see FIG. 2 as described later).

Figure 1:
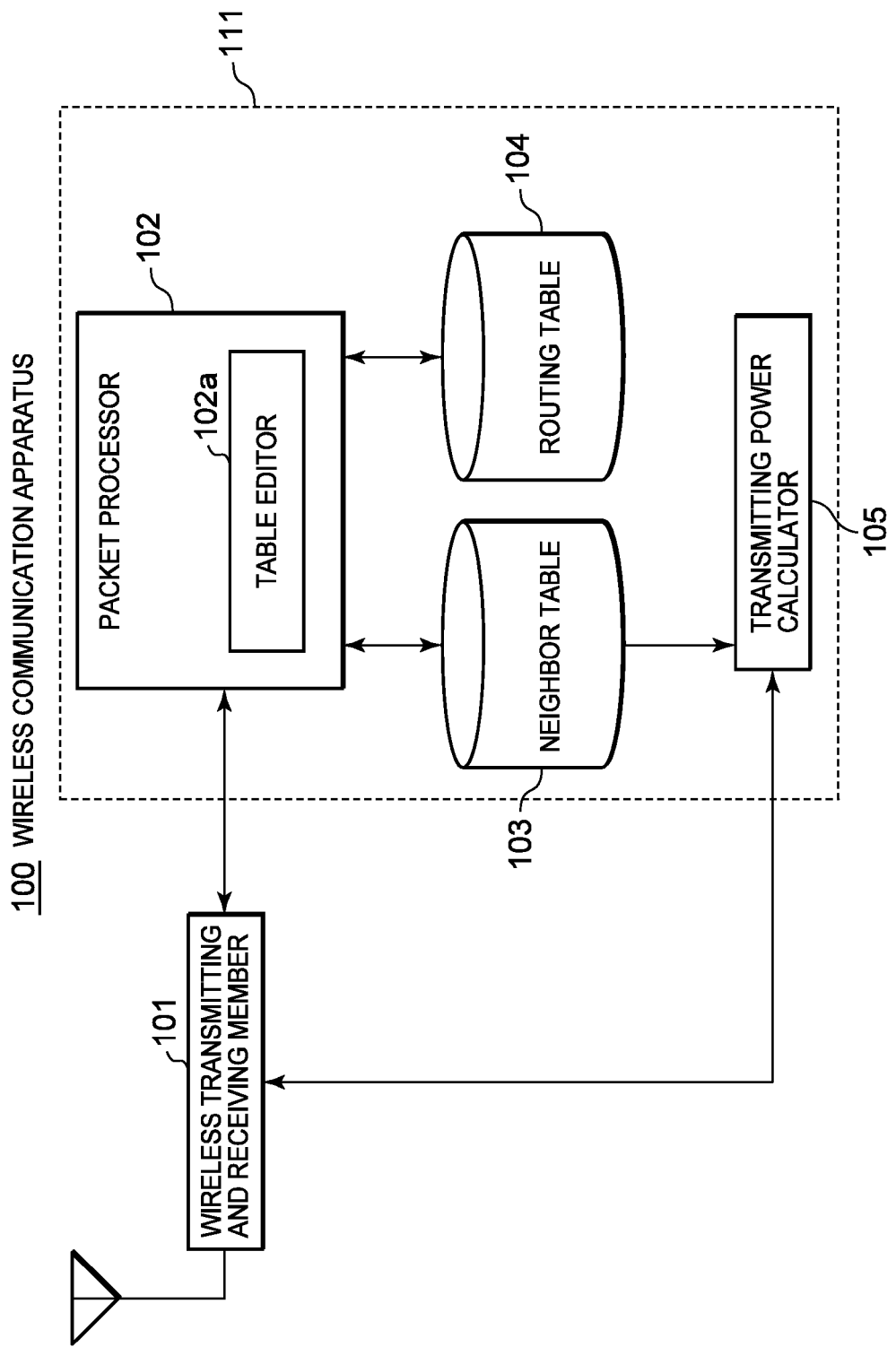
FIG. 1 illustrates a block diagram of the functional composition of a wireless communication apparatus according to a first embodiment.

FIG. 1 illustrates a block diagram of a functional composition of a wireless communication apparatus 100 according to the first embodiment. A part of the composition of the wireless communication apparatus 100 of FIG. 1 may include a CPU and a composition of software, depending on a program performed by the CPU.

As illustrated in FIG. 1, the wireless communication apparatus 100 may include a wireless transmitting and receiving member 101 ("wireless transmitter," "wireless receiver," or "wireless transmitter and receiver"), a packet processor 102, a neighbor table 103, a routing table 104, and a transmitting power calculator 105. An information control storage member 111 may include the packet processor 102, the neighbor table 103, the routing table 104, and the transmitting power calculator 105. The packet processor 102 may include a table editor 102a.

The wireless transmitting and receiving member 101 may handle a sending process to let an antenna radiate a packet as a control packet, or radiate a data packet received from the packet processor 102, to a radio wave space. The wireless transmitting and receiving member 101 may also give a receiving packet obtained from a signal caught by the antenna to the packet processor.

The wireless transmitting and receiving member 101 may serve as a transmitting processing composition and may include a digital modulator that creates a wireless signal by digitally modulating a bit line of the packet, and a power amplifier that amplifies the electrical power of the wireless signal and gives the wireless signal to the antenna. The power amplifier may switch over a transmitting power by changing a gain by an external gain control signal. The power amplifier may also include power amplifying circuits having different power transmitting characteristics, respectively, and may switch over a transmitting power to activate only one of the power amplifying circuits depending on an external selection signal.

The wireless transmitting and receiving member 101 may serve as a receiving processing composition that may include a preamplifier amplifying the wireless signal obtained by catching the radio wave by the antenna, a band pass filter for the wireless signal, and a digital demodulator regenerating the bit line by demodulating the wireless signal. In addition, the receiving processing composition may include a composition to catch the strength of a received radio wave. For example, wireless transmitting and receiving member 101 may be configured as a detector for receiving electric field strength (RSSI). When the digital demodulator includes the AGC (Automatic Gain Control) circuit, it is possible to use the AGC control signal as a signal describing the power of the receiving signal.

Packet processor 102 may include the following features. A first feature is to handle the sending process of the control packet and the data packet, to handle the receiving process thereof, and to handle the relaying process thereof. A second feature is to transmit a Hello packet regularly to notify node information of itself and to transmit and relay a TC (Topology Control) packet associated with a topology of an associated network. A third feature is to receive the Hello packet and the TC packet. A fourth feature is that when a data is given by an information processor connecting to the wireless communication apparatus 100, the wireless communication apparatus 100 may create and transmits the data packet, and when the wireless communication apparatus 100 receives the data packet transmitted thereto, the wireless communication apparatus 100 may resolve the data packet, take data from the data packet, and give the data to the information processor. Furthermore, when the wireless communication apparatus 100 receives the data packet of which the destination is to another wireless communication apparatus, the wireless communication apparatus 100 may relay and transmit the data packet. A fifth feature is to arrange the table editor 102a. The table editor 102a may update the neighbor table 103 and the routing table 104 arbitrarily.

Figure 2:
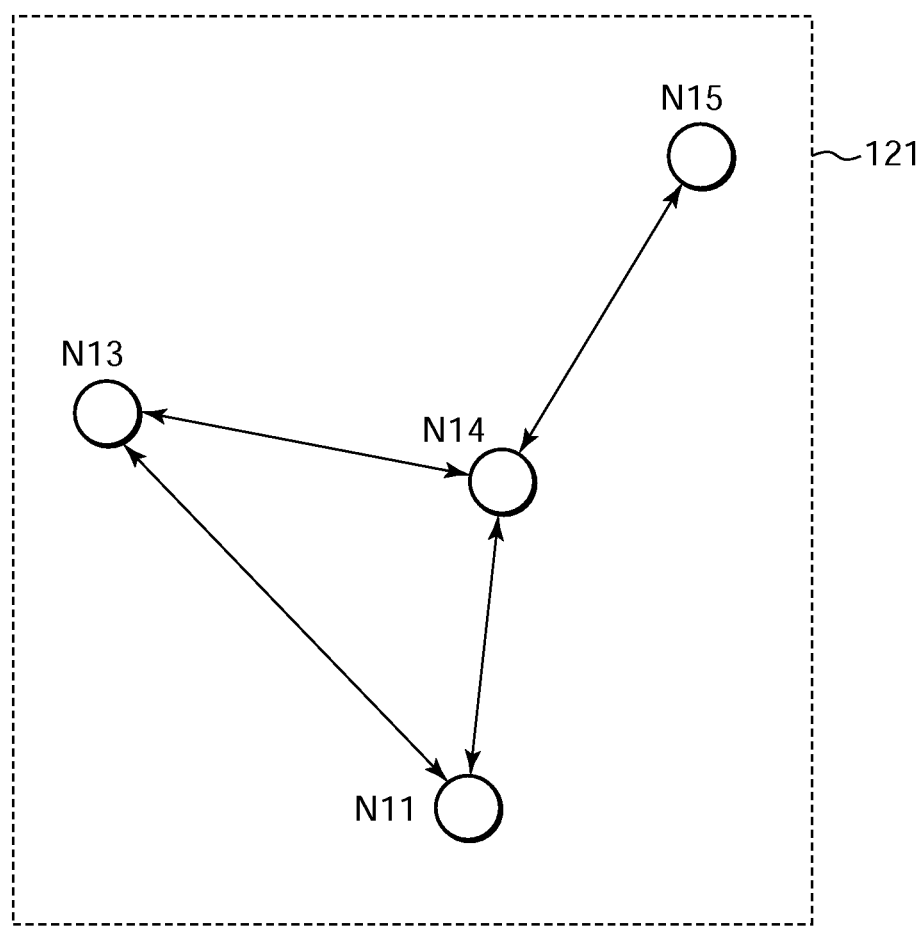
FIG. 2 illustrates a network topology according to the first embodiment.

FIG. 2 illustrates a network topology of the first embodiment. FIG. 3 illustrates the composition of the neighbor table and describes the neighbor table 103 of the node N11 in regard to including the network topology as shown in FIG. 2.

The neighbor table 103 may include at least discrimination information (an address of the node) of a neighbor node such as another wireless communication apparatus, a link condition among the neighbor nodes, an attenuation of the wireless signal received from each neighbor node, and information of whether or not a link between the node and the neighbor node is used on a route (e.g., existence or non-existence of use of the link on the route). It may be that the information of existence or non-existence of use is not described in the neighbor table 103, and when the information thereof is needed, the information thereof is given by reference to the routing table 104. Thus, neighbor table 103 may include link information (first information) of a link with a neighboring wireless communication apparatus.

The discrimination information of the neighbor node maybe distributed by assigning a single line of the neighbor table 103 when the control packet (for example, the Hello packet) is received from the neighbor node. The control packet received from the neighbor node may include information of the node neighboring the neighbor node. When the wireless communication apparatus 101 is able to receive the control packet from the neighbor node, but the wireless communication apparatus 101 is not described as a neighbor node in the control packet, "simplex" may be described in the link condition of the neighbor table 103. When the wireless communication apparatus 101 is described as a neighbor node in the control packet received from the neighbor node, "duplex" may be described in the link condition. When each node transmits the control packet, transmitting power information may be inserted into the control packet when transmitting the control packet. Regarding the strength of a receiving wave in receiving the control packet from the neighbor node from the wireless communication apparatus 101, it may be possible to calculate the attenuation as a difference between the strength of the receiving wave and the transmitting power information inserted into the control packet, and the attenuation is then described in the neighbor table 103. It may be possible to confirm whether or not the link among the neighbor node is used as a communication route. The result of this confirmation may be described in the information of existence or non-existence of use.

Whatever method may be applied for transmitting and receiving the control packet and getting the topology of the network, or deciding the route from the node to each other node, may be obtained by topology or the neighbor node information. The above methods may also be applied in association with describing the route information (second information) in the routing table 104.

The transmitting power calculator 105 may calculate the transmitting power in transmitting the control packet and the data packet by the information stored in the neighbor table 103, and may arrange the transmitting power in the wireless transmitting and receiving member 101. The transmitting power calculator 105 may calculate the transmitting power regularly, updating the neighbor table 103, prior to transmitting the control packet and the data packet.

Operation of the First Embodiment

The operation of the wireless communication apparatus 100 of the first embodiment will be described according to an order of a review of the operation of the neighbor table as it receives the control packet, and a calculation operation of the transmitting power.

Each node transmits the control packet to the neighbor node regularly to notify a presence thereto. When the packet processor 102 of the neighbor node receives the control packet, the packet processor 102 starts a process as shown in a flow chart of FIG. 4.

At step S101, the packet processor 102 discriminates whether or not the discrimination information of the neighbor node that is a source host of the receiving control packet is described in the neighbor table 103.

At step S102, if the neighbor node is not described in the neighbor table 103, the packet processor 102 describes the discrimination information of the neighbor node therein, after adding the line of the neighbor node therein.

At step S103, when the discrimination information of the neighbor node that is the transmitting source is already described in the neighbor table 103, or the discrimination information is described by adding new line in receiving the control packet from the neighbor node, the packet processor 102 discriminates whether or not the discrimination information of the neighbor node of the receiving control packet includes the discrimination information of the node of the packet processor 102.

At step S104, when the discrimination information of the node is included, the packet processor 102 may insert "duplex" into the link condition of the neighbor table 103.

At step S105, when the discrimination information of the node is not included, the packet processor 102 may insert "simplex" into the link condition of the neighbor table 103.

At step S106, the packet processor 102 considers the strength of the receiving wave from the wireless transmitting and receiving member 101 in receiving the control packet from the neighbor node after inserting the link condition, calculates the attenuation by the difference between the transmitting power information inserted into the control packet and the strength, and may describe the attenuation into the neighbor table 103.

At step S107, the packet processor 102 discriminates whether the link of the neighbor node is used as the communication route by the description content of the routing table 104.

At step S108, if the link is used as the communication route, the packet processor 102 may describe the symbol "○" indicating the use in the column of "USING IN ROUTE" of the neighbor table 103.

Figure 4:
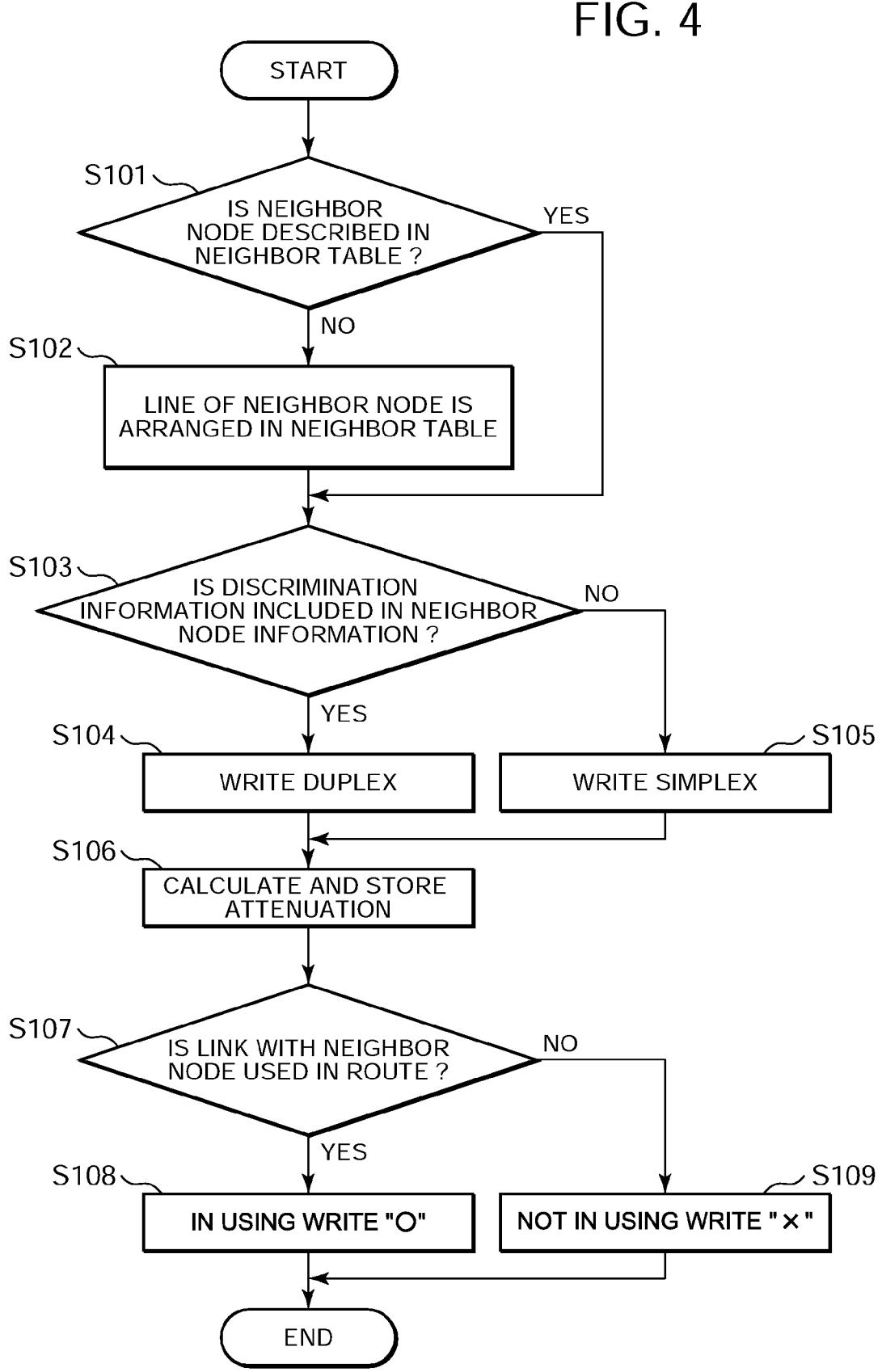
FIG. 4 is a flowchart indicating an updating operation of the neighbor table upon receiving a control packet according to the first embodiment.

As S109, if the link is not used as the communication route, the packet processor 102 describes the symbol "×" indicating the nonuse in the column of "USING IN ROUTE" of the neighbor table 103 and ends the receiving process of the control packet shown in FIG. 4.

The transition from step S106 to step S107 may be executed after updating the routing table 104 with receiving the control packet.

It is also contemplated that when the node including the packet processor 102 does not receive the control packet from the other neighbor nodes for a relatively long amount of time, relative to a predetermined time from, the line of the other neighbor nodes are deleted from the neighbor table 103.

Next, the calculating operation of the transmitting power operated by the transmitting power calculator 105 will be described. If routine set up conditions of the transmitting power calculator 105 are performed, the transmitting power calculator 105 starts operations as illustrated in the flow chart of FIG. 5.

At step S201, the transmitting power calculator 105 discriminates weather or not the link condition described in the neighbor table 103 includes at least one simplex. For example, in the case of the composition example of the neighbor table 103, link N12 may include a simplex condition.

At step S202, if at least one link has a simplex condition, the transmitting power calculator 105 calculates the transmitting power to arrive at the neighbor node from the initial node by reference to the attenuation of the link described the neighbor table 103, and arranges the transmitting power to the wireless transmitting and receiving member 101. In other words, the transmitting power calculator 105 changes from the simplex condition to the duplex condition. Then, the process shown in FIG. 5 ends. The transmitting power after updating is determined by considering that the attenuation of the link is the same as each other. If the link as the simplex is a "one," the transmitting power after updating is calculated as ("the transmitting power after updating"—"the attenuation of this link") and is more than a routine transmitting power. If the link as the simplex are more than "two," the maximum attenuation of the attenuation of these links is detected, and the transmitting power after updating is calculated as ("the transmitting power after updating"—"the maximum attenuation") and is more than a routine transmitting power. A lower transmitting power decided by wireless standards and a hardware, or an intermediate value of an upper to lower transmitting power, are possible to apply to a routine transmitting power in this case.

At step S203, if only one link having the simplex condition is not subsistent, the transmitting power calculator 105 discriminates whether or not the link that is the duplex and is used in the route is subsistent by reference of existence or non-existence of use in the route of the neighbor table 103. In the case of the composition example of the neighbor table 103, the link N13 is the link having the duplex condition and is not used in the route. In addition, in the case of the composition example of the neighbor table 103, because the link having the simplex condition is subsistent, the transmitting power calculator 105 does not transition to step S203.

Figure 5:
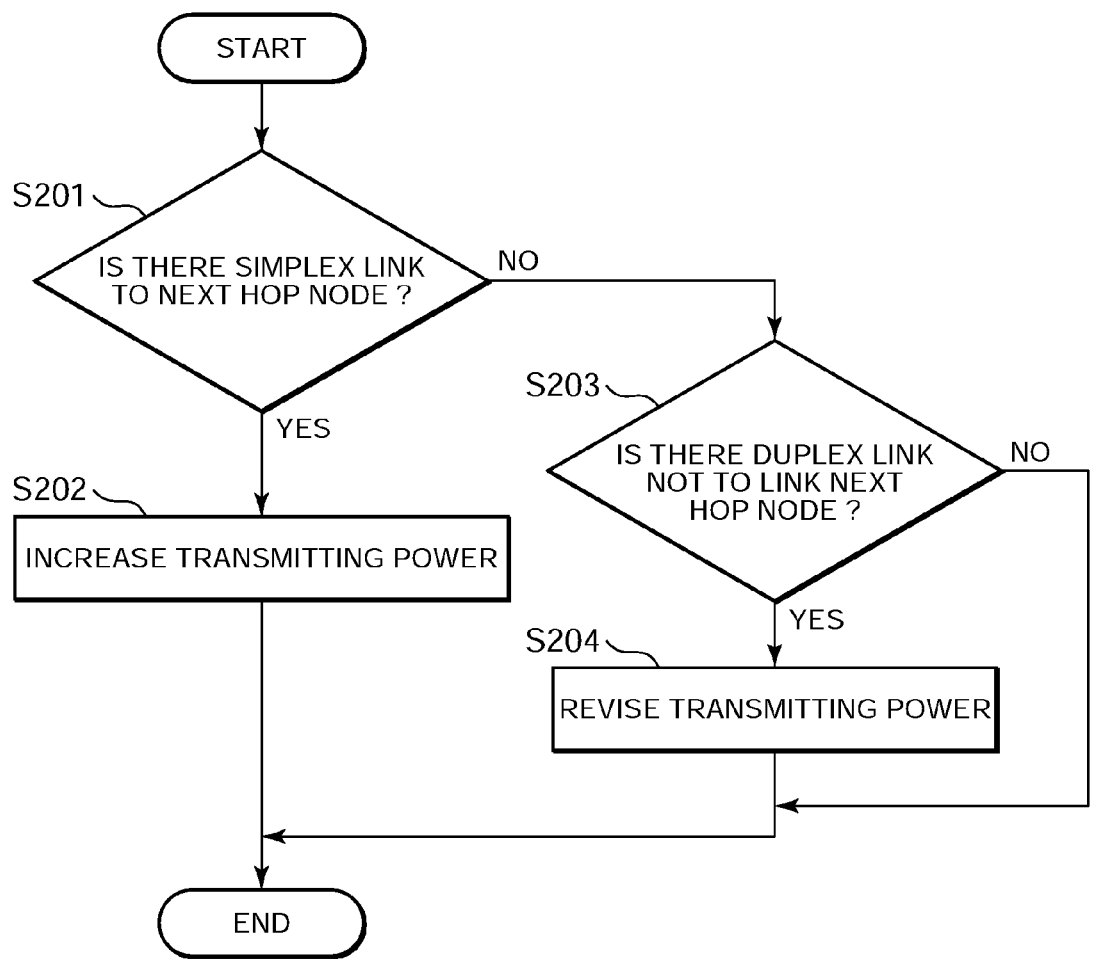
FIG. 5 is a flow chart indicating a calculation operation of a transmitting power according to the first embodiment.

A step S204, if at least one link of which condition is the duplex and is not used in the route is subsistent, the transmitting power calculator 105 arranges the transmitting power, which is reviewed and updated, to the wireless transmitting and receiving member 101. Then the process shown in FIG. 5 is ended. On the other hand, if only one link having the duplex condition and not used in the route is not subsistent, the transmitting power calculator 105 does not review and maintain the past transmitting power. Then, the process shown in FIG. 5 is ended.

As described above, when the link conditions with all the neighbor nodes are the duplex condition, the process transitions to step S203. In this case, the transmitting power from the node is "appropriate" or "redundancy". Because the link not used as the route has a relatively long length of link, it has a possibility to become unsteady depending on the routing method. For example, the node N13 of FIG. 2 may transfer a packet from the node N11 by one hop, but is likely to become unsteady during transfer due to a distance from the node N11 to the node N13 being long. Therefore, a transferring from the node N11 to the node N13 sometimes may preferably include prefers a two-hop transfer through the node N14. Similar to node N13, the control packet from node N11 may arrive by a minimum transmitting power by which it is possible to make out a presence as the neighbor node. Namely, in the first embodiment, if the link having the duplex condition is not used in the route and is subsistent, the transmitting power is assumed excess and is reviewed.

The following method is possible to apply as the updating method of the transmitting power used by the transmitting power calculator 105 at step S204. A maximum attenuation is detected from each attenuation of the neighbor nodes regarding the neighbor nodes of which the link is used as the route. Next, an updating candidate transmitting power is calculated as ("the maximum attenuation"+"a standard of the receiving power"). When a current transmitting power is larger than the updating candidate transmitting power, the transmitting calculator 105 allows the wireless transmitting and receiving member 101 to arrange the updating candidate transmitting power. It is possible to reduce the transmitting power just for ("the current transmitting power"—"the updating candidate transmitting power"). In addition, when the current transmitting power is less than the updating candidate transmitting power, the current transmitting power may be maintained. The transmitting power may also be increased, but the updating candidate transmitting power may be changed.

The calculation process of the transmitting power shown in FIG. 5 is performed repeatedly and intermittently, and the transmitting power of the wireless transmitting and receiving member 101 is arranged to be as small as possible so as not to occur in the simplex link condition.

According to the first embodiment, it is possible to reduce the transmitting power for maintaining the connectivity, the interference of the radio wave, and the collision of the packets, by controlling the transmitting power to maintain the duplex link condition in the route.

And according to the first embodiment, it is possible to reduce the transmitting power as the route based on the transmitting power of the wireless communication apparatus 100 is being varied, while not changing the route.

Second Embodiment

A wireless communication apparatus, a wireless communication system and a transmitting power control method of a second embodiment will be described by reference to FIGS. 6-10. The second embodiment reduces a transmitting power associated with maintaining network connectivity by combining a route control with the composition of the first embodiment.

Composition of the Second Embodiment

Figure 6:
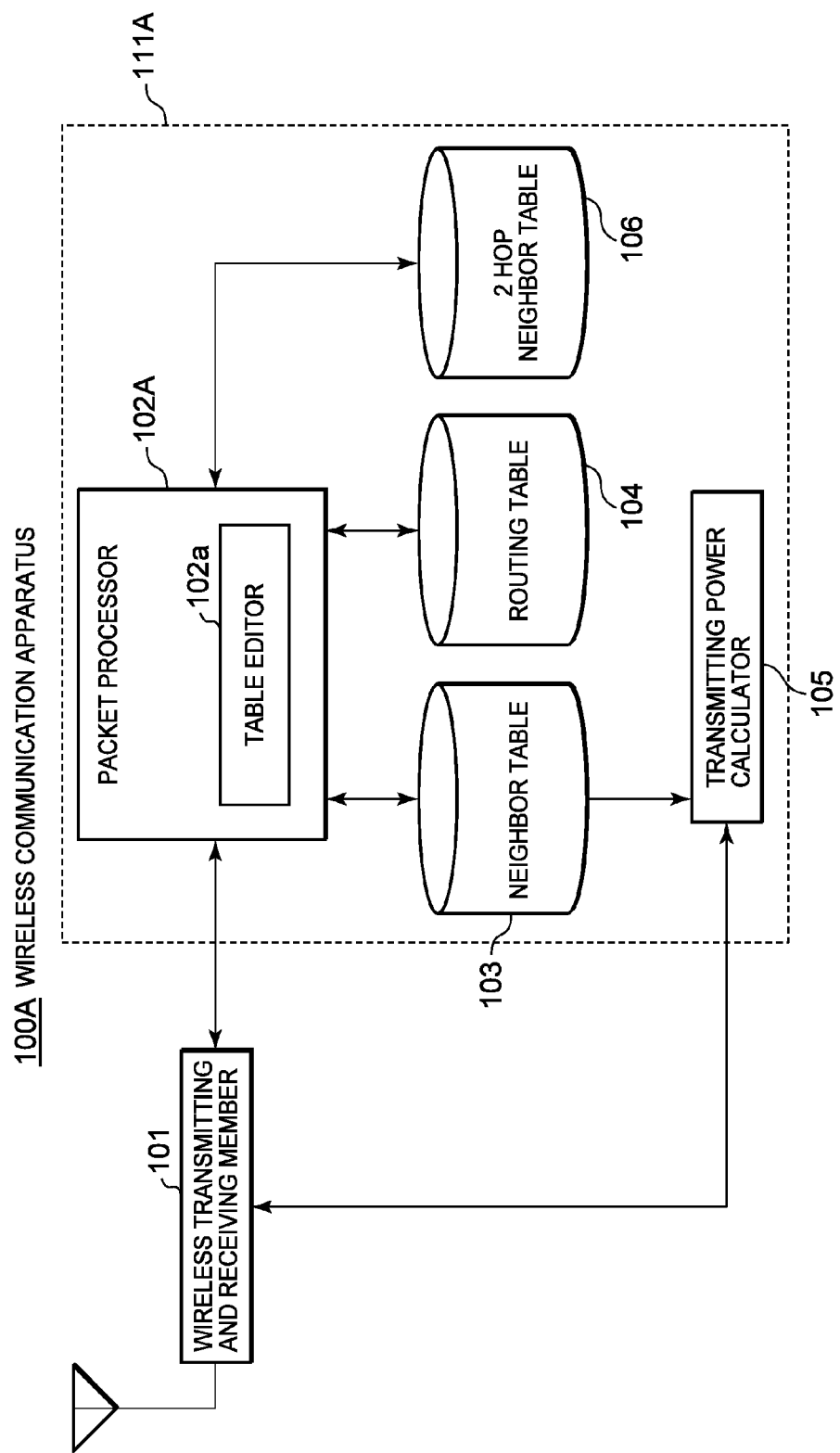
FIG. 6 illustrates a block diagram of the functional composition of a wireless communication apparatus according to a second embodiment.

FIG. 6 is a block diagram illustrating a functional composition of a wireless communication system of a second embodiment.

As illustrated in FIG. 6, in addition to the wireless transmitting and receiving member 101, the neighbor table 103, the routing table 104, and the transmitting power calculator 105, wireless communication apparatus 100A may include a two-hop neighbor table 104 and a packet processor 102A in place of the packet processor 102. An information control storage 111A may include the packet processor 102A, the neighbor table 103, the routing table 104, the transmitting power calculator 105, and the two-hop neighbor table 106. As illustrated in FIG. 6, the neighbor table 103 and the two-hop neighbor table are shown separately, but the neighbor table 103 and the two-hop neighbor table may be integrated into a single table.

Figure 7:
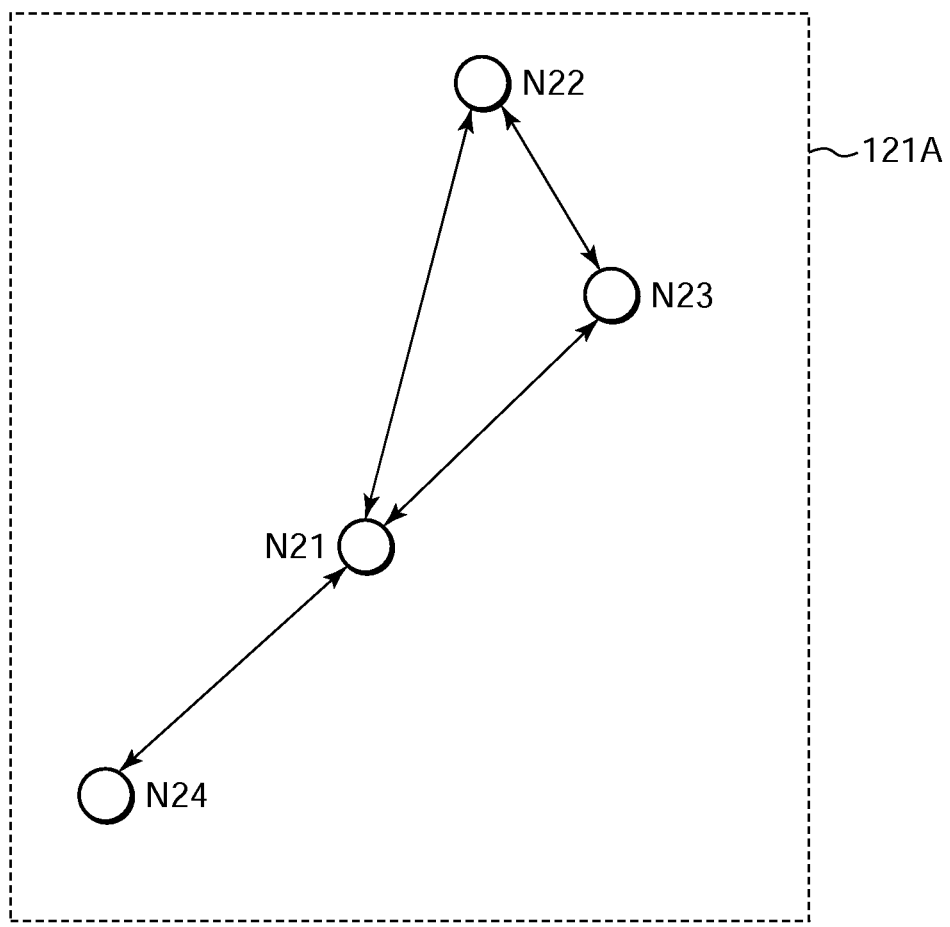
FIG. 7 illustrates a network topology according to the second embodiment.

FIG. 7 illustrates a network communication system 121A and a network topology of the second embodiment. FIG. 8 illustrates a composition example of the neighbor table 103, and depicts the neighbor table 103 of the node N21 including the topology of the network shown in FIG. 7. FIG. 9 illustrates a composition example of the two-hop neighbor table 106, and depicts the two-hop neighbor table 106 of the node N21 including the topology of the network shown in FIG. 7.

Discrimination information of a node neighboring a neighbor node is illustrated in the two-hop neighbor table that relates to the discrimination information. The discrimination information is inserted into a control packet that is transmitted from the neighbor node. For example, the control packet may be a Hello packet. The packet processor 102 may create and edit the two-hop neighbor table 106 by using the inserted information.

As illustrated in FIG. 9, the two-hop neighbor table 106 may describe nodes N21 and N23 that are neighbors to a neighbor node N22, the nodes N21 and N22 that are neighbors to the neighbor node N23, and the node N21 that is a neighbor to a neighbor node N24.

In the second embodiment, the wireless communication apparatus 100A may changes a route and updates the neighbor table 103 with reference to the information of the two-hop neighbor table 106. These changes and updates may affect a calculation of a transmitting power.

Additionally, a number of lines of the neighbor table 103 may not correspond directly to a number of lines of the two-hop neighbor table 106. As further described below relating to an operation of the second embodiment, it is possible to delete a line of the neighbor node, which fulfills a certain condition, from the neighbor table 103.

Operation of the Second Embodiment

An operation of the wireless communication apparatus of 100A of the second embodiment will be described. In the second embodiment, a review operation of the neighbor table 103 by receiving the control packet and a calculation operation of the transmitting power are similar to the first embodiment. An explanation of creation and editing operations of the two-hop neighbor table 106 has already been described above and is therefore omitted below.

Figure 10:
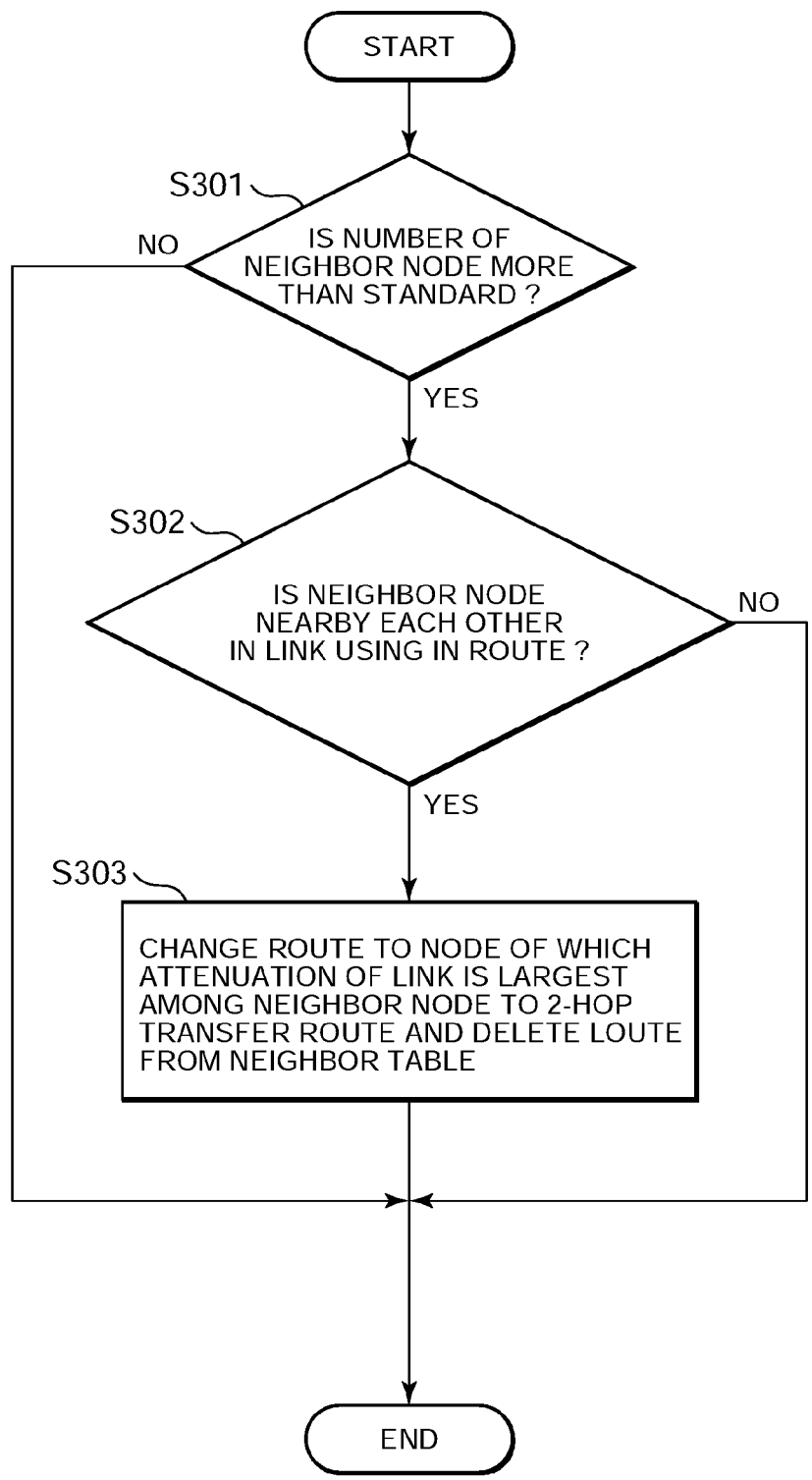
FIG. 10 is a flow chart indicating a route modification operation by reference to the two-hop neighbor table according to the second embodiment.

A route changing operation by reference to the two-hop neighbor table 106, as illustrated in FIG. 10, is described below.

The packet processor 102 may execute the route changing operation regularly, each time the two-hop neighbor table 106 is updated, immediately after the routing table 104 is updated, and immediately before the calculating operation of the transmitting power. The executing timing may additionally be executed at any other suitable time.

At step S301, the packet processor 102 discriminates whether a number of the neighbor nodes is greater than a threshold number based on reference to the neighbor table 103. This discrimination serves to discriminate whether or not a neighborhood of the node is a dense area of the node. When a number of the neighbor nodes are less than the threshold number based on reference to the neighbor table 103, the packet processor 102 ends the processes shown in FIG. 10.

At step S302, when a number of the neighbor nodes are more than the threshold number based on reference to the neighbor table 103, the packet processor 102 discriminates whether or not a pair of nodes neighboring each other in the neighbor nodes, which correspond to the top of links used in the route, are subsistent by reference to the neighbor table 103 and the two-hop neighbor table. As illustrated in FIG. 9, the following is depicted: the node N22 neighbors the node N23 by the two-hop neighbor table 106 of the node N21, and the link with the node N22 and the link with the node N23 are used in the route concurrently by the neighbor table 103 of the node N21. When the packet processor 102 of the node N21 executes the step S302, the packet processor 102 discriminates whether or not the pair of nodes is subsistent. When the pair of nodes is not subsistent, the packet processor ends the process shown in FIG. 10.

At step S303, when the pair of nodes is subsistent, the packet processor 102 compares each attenuation of the neighbor nodes belonging to the pair described in the neighbor table 103 and detects the neighbor node having the largest attenuation. The packet processor 102 then changes the route of the neighbor node to the route by two-hop transferring, deletes the line of the neighbor node from the neighbor table 103, and ends the process shown in FIG. 10.

In an example shown in FIGS. 8 and 9, the packet processor 102A deletes the line of the node N22 in which the attenuation is larger than the node N23 between the nodes N22 and N23, which neighbor the node N21 and each other. In the calculation operation of the transmitting power, if the node N22 is not yet deleted, the attenuation of the neighbor node N22 among the neighbor nodes N22 to N24 is detected as a maximum attenuation, and the transmitting power is reviewed to determine whether the transmitting power is excessive relative to connecting the neighbor node N22. If the node N22 is already deleted, the attenuation of the node N23 between the nodes N23 and N24 is detected as the maximum attenuation, the transmitting power is reviewed to determine whether the transmitting power is excessive relative to connecting the neighbor node N23, and a likelihood of reducing the transmitting power is increased.

In addition, the neighbor node deleted from the neighbor table 103 may preferably change the route corresponding to the route changing of the deleted node. For example, when the node N21 changes the route to the node N22 into the route going through the node N23 from a direct route, it is also preferred that the node N22 changes the route to the node N21 into the route going through the node N23 from a direct route.

The neighbor node deleted from the neighbor node 103 may execute a similar route that changes autonomously, and by the acknowledgement from the deleted node. Accordingly, the node N21 deletes the node N22. For example, the route may be changed through the node N23 by the control packet to the node N22, and node N22 may change the route from the node N22 to the node N21 into the route going through the node N23. The node N21 may not insert the information of the node N22 into the neighbor node information in the control packet transmitted by the node N21 to the all neighbor node and the node N22 may decide the route passing through the node N23 by making out the changing from the duplex condition to the simplex condition and changing the route to node N21 into the route of the two-hop, which transfers autonomously by receiving the control packet. In addition, the route may pass through the other node. In the latter situation, it is preferred that the control packet reaches the node N22 by the control packet being transmitted once or twice after the process of FIG. 10 ends, and the neighbor node information thereof does not include the information of node N22, transmitted correspondingly according to the previous transmitting power.

It is possible to have a similar effect with the first embodiment as by the second embodiment. In the second embodiment, furthermore, the utilized route that is the link having the larger attenuation of the radio wave, and that is capable of being offset, is changed into the route having two-hop or more and is excluded from the link that is considered in the control of the transmitting power. As a result, it is possible to reduce the broad transmission and broadly maintain the connectivity of the network.

Other Embodiment

The above embodiments described that the attenuation corresponds to an amount subtracted from the strength (receiving power) in receiving the wireless signal from the transmitting power. The attenuation may also be detected as a proportion of the strength (receiving power) in receiving the wireless signal against the transmitting power that may be described in the table. In this case, the updating transmitting power may be calculated as ("the updated transmitting power"×"the attenuation") and may be more than the routine transmitting power in the step S204. The updating candidate transmitting power calculated by ("the standard of the receiving power"÷"the maximum attenuation"="the updating candidate transmitting power") may be used in the step S204.

The above embodiments were described such that the transmitting power is increased up to a calculated value in short bursts. The transmitting power may also be increased by any other suitable unit and may reach the transmitting power associated with an improved simplex condition.

Each of the above embodiments was described such that the attenuation calculated by the transmitting and receiving of the normal control packet is described in the neighbor table 103. The attenuation may also be detected by the control packet arranged so that the control packet detects the attenuation. This control packet for detecting the attenuation may be transmitted by a transmitting power that is fixed in all systems, and the information of the transmitting power may need not be inserted into the control packet.

Each of the above embodiment was described so that the attenuation obtained by a single occurrence of a control packet being received is described in the neighbor table 103. An average value of obtained multiple control packets being received may also be described in the neighbor table 103. The average may be, for example, a weighted average obtained by increasing a weight of the side.

Each above embodiment was described so that the attenuation is the amount subtracted the strength (receiving power) in receiving the wireless signal from the transmitting power. The attenuation described in the neighbor table 103 may also be added with a margin that maintains connectivity. The same may be true in changing the attenuation into a fraction.

Each of the above embodiments was described so that the transmission of the control packet and the data packet are transmitted according to a controlled transmitting power. Also, only a portion of the packets may be transmitted according to the controlled transmitting power. For example, the control packet may be transmitted according to the controlled transmitting power and the data packet may be transmitted according to the transmitting power that is determined individually by the attenuation of the link with the neighbor node (a destination node or a relay node) that is determined by the destination node. Also, the control packet or the data packet (the packet being, for example, multicast or broadcast) may be transmitted by the controlled transmitting power and the transmitting power of a packet. The destination of the packet may be a node, and may be decided individually by the attenuation of the link with a neighbor node determined by the destination node, and the packet may be transmitted by the determined transmitting power.

The above second embodiment was described so that it is determined whether or not the neighbor node used on the route from the node is changed, not to be used on the route only if the neighbor node numbers are greater than a predetermined threshold. It also may not be a judgment condition that the neighbor node numbers are greater than a predetermined threshold.

The above second embodiment was described so that when a pair of the nodes neighboring each other among the neighbor nodes, which are the end of the line used on the route being subsistent, the line of the neighbor node that belongs to the pair that has the maximum attenuation is deleted from the neighbor table 103. Several neighbor nodes belonging to the pair may also be deleted.

Figure 11:
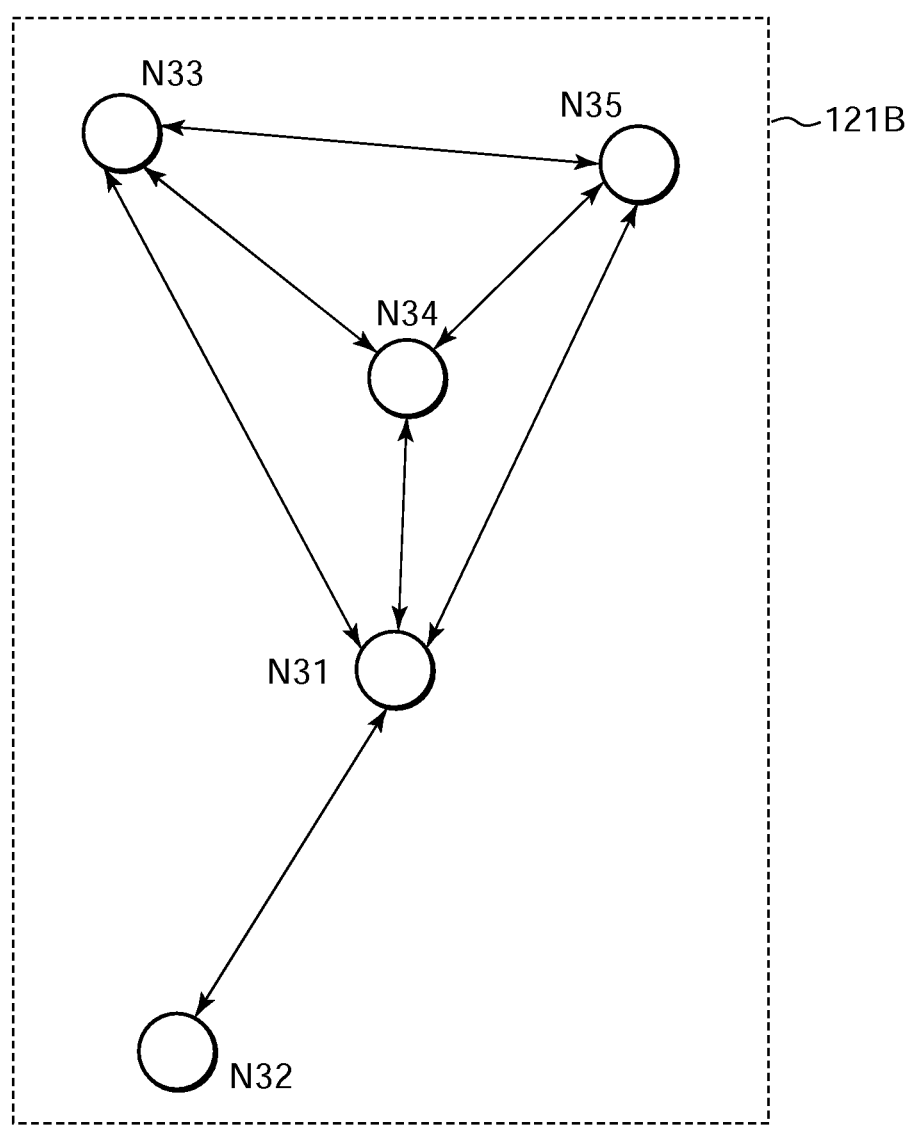
FIG. 11 illustrates a first example of a network topology used to explain another embodiment.

FIG. 11 illustrates a wireless communication system 121b of another embodiment. In the network topology as depicted in FIG. 11, the packet processor 102A may delete the neighbor node N33 and N35 from the neighbor table 103. The neighbor node belonging to a pair of the attenuation may be more than a routine percentage of the maximum attenuation (for example, 90%), except that the neighbor node of the minimum attenuation belonging to a pair thereof may be deleted with the neighbor node of the maximum attenuation from the neighbor table 103.

The above second embodiment was described so that, when a pair of the nodes neighboring each other among the neighbor nodes that are the end of the line used on the route is subsistent, the line of the neighbor node belonging to the pair is deleted from the neighbor table 103. The deleted node may also be determined according to information associated with several pairs.

Figure 12:
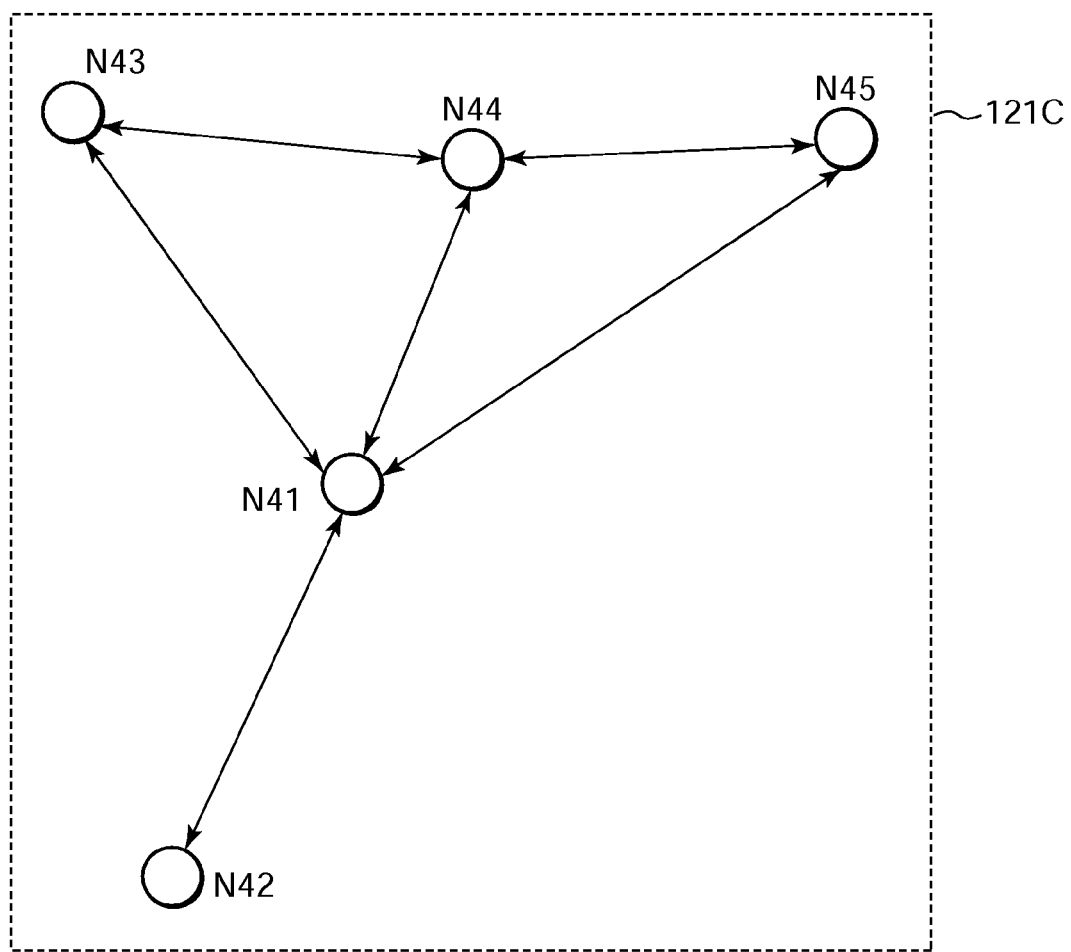
FIG. 12 illustrates a second example of a network topology used to explain another embodiment.

FIG. 12 illustrates a wireless communication system 121c of another embodiment. In the network topology as depicted in FIG. 12, the node N43 does not neighbor the node N45, but the node N44 neighbors the node N43 and N45. Therefore it may be determined that the node N44 that is common in two pairs may remain, and one or several other nodes are deleted from the neighbor table 103.

The features of each above embodiment may be combined with any suitable feature of any of the other above-disclosed embodiments. For example, in the first embodiment, if the link of the simplex to the neighbor node is subsistent, the process of increasing the transmitting power may be executed immediately. Also, if the link of the simplex to the neighbor node is subsistent, the node may connect other neighbor nodes of the link, and it may be confirmed whether or not a candidate node for a route is neighboring the node. When a node similar to the candidate for the route is not subsistent, the transmitting power may be increased. When the node similar to the candidate for the route is subsistent, the route to the neighbor node of the simplex condition may be changed to a route passing through the candidate node for the route, and the line of the neighbor node of the link of the simplex condition may be deleted from the neighbor table 103.

What is claimed is:

1. A wireless communication apparatus having a plurality of neighboring wireless communication apparatuses, comprising:

a wireless transmitter configured to transmit a wireless signal with a transmitting power to a destination wireless communication apparatus;

an information control storage member configured to maintain first information of links between the wireless communication apparatus and the plurality of neighboring wireless communication apparatuses, and second information of a communication route between the wireless communication apparatus and the destination wireless communication apparatus; and a transmitting power calculator configured to calculate the transmitting power based on the first and second information, so as to ensure reception of the wireless signal;

wherein the first information includes, for each of the links, information indicating whether the link is in a duplex condition or in a simplex condition, and information indicating radio wave attenuation on the link;

wherein the second information includes information indicating whether or not each of the links is used in the communication; and wherein the transmitting power calculator is configured, if one of the links is used in the communication route and is in the simplex condition, to calculate the transmitting power and to change the first information of the one link to indicate the duplex condition, and if the links used in the communication routes are in the duplex condition, to calculate a minimum transmitting power to maintain the duplex condition.

2. The wireless communication apparatus of claim 1, wherein the information control storage member is configured to change the communication route to use one of the links that has a smaller attenuation than one of the links in the communication route.

3. The wireless communication apparatus of claim 2, wherein:

the first and second information include information of ones of the plurality of neighboring wireless communication apparatuses that are accessible by two-hops; and the changed communication route is a two-hops route.

4. A wireless communication system, comprising:

a plurality of wireless communication apparatuses of claim 1 that are decentrally arranged.

5. A transmitting power control method performed by a wireless communication apparatus having a plurality of neighboring wireless communication apparatuses in a multi-hop network, the method comprising:

maintaining first information including links between the wireless communication apparatus and the plurality of neighboring wireless communication apparatuses, and second information including a communication route between the wireless communication apparatus and a destination wireless communication apparatus;

calculating a transmitting power for a wireless signal based on the first and second information; and controlling a wireless transmitter to transmit the signal using the calculated transmitting power;

wherein the first information includes, for each of the links, information indicating whether the link is in a duplex condition or in a simplex condition, and information indicating radio wave attenuation on the link;

wherein the second information includes information indicating whether or not each of the links is in the communication route; and wherein said calculating includes, if one of the links is in the communication route and is in the simplex condition, calculating the transmitting power and changing the first information of the one link to indicate the duplex condition, and if the links in the communication route are in the duplex condition, calculating a minimum transmitting power to maintain the duplex condition.

* * * * *